United States Patent [19]

Shyu

[11] 4,146,482
[45] Mar. 27, 1979

[54] SYSTEM FOR COLLECTING OIL
[75] Inventor: Ji Yn Shyu, Kaohsiung, Taiwan
[73] Assignee: Yin-Lung Yang, Kangshan, Taiwan
[21] Appl. No.: 880,073
[22] Filed: Feb. 22, 1978
[51] Int. Cl.² ............................................. E02B 15/04
[52] U.S. Cl. ......................... 210/242 S; 210/DIG. 25
[58] Field of Search ........ 210/83, 242, 61 F, DIG. 25

[56] References Cited

U.S. PATENT DOCUMENTS

| | | | |
|---|---|---|---|
| 2,876,903 | 3/1959 | Lee | 210/242 S |
| 3,532,219 | 10/1970 | Voldespino | 210/DIG. 25 |
| 3,590,584 | 7/1971 | Fitzgerald | 210/242 S |
| 3,684,095 | 8/1972 | Ayen | 210/242 S |
| 3,688,506 | 9/1972 | Marcocchio | 210/242 S |
| 3,762,548 | 10/1973 | McCabe | 210/DIG. 21 |
| 3,771,662 | 11/1973 | Muramutsu | 210/242 |
| 3,815,751 | 6/1974 | Parlone | 210/242 S |
| 3,853,768 | 12/1974 | Bagnulo | 210/DIG. 25 |
| 3,922,862 | 12/1975 | Vidilles | 210/DIG. 25 |
| 3,983,034 | 9/1976 | Wilson | 210/242 S |

*Primary Examiner*—Theodore A. Granger

[57] ABSTRACT

This invention relates to apparatus for collecting oil floating on a sea surface. This is by a collecting panel and tube with the force of waves pushing oil mixed with water and dirt under some conditions, causing the oil to flow into said panel and tube automatically. The tube leads the oil to a container under sea level wherein the said oil and water can be separated and filtered, and then pure oil is pumped to a nearby ship for storage. Thus, not only pollution will be avoided but also the lost oil can be collected and reused.

3 Claims, 3 Drawing Figures

# SYSTEM FOR COLLECTING OIL

BACKGROUND OF THE INVENTION

Since oil supply is the most important energy resource for today's industrial world, experience tells us that there are many sea accidents occuring to the oil carriers and much oil has been lost at sea. Worse, oil pollution has killed a great deal of oceanic life and destroyed oceanic balances greatly threatening human life.

Although there are several mechanical or chemical methods used in the collection of lost oil floating on sea, none of them are believed as efficient as this invention.

The object of this invention is to provide a more effective means for the collection of lost oil floating on the sea.

Another object of this invention is to prevent greater pollution by the spreading of such lost floating oil.

Other objects will be apparent taken in connection with the following description;

In which.

Figure 1:
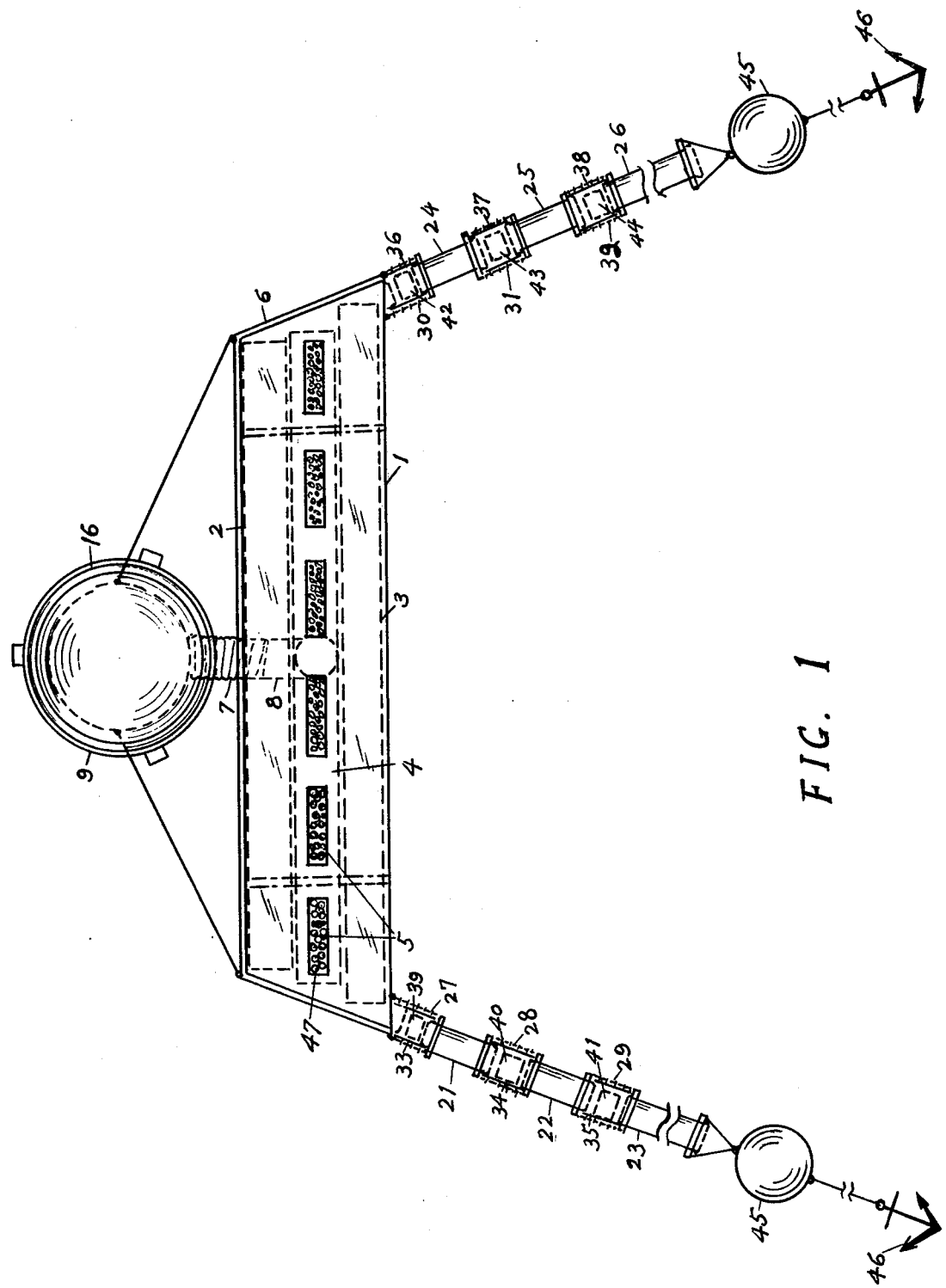
FIG. 1 shows the top view of an overall system of this invention on a sea surface.
Figure 2:
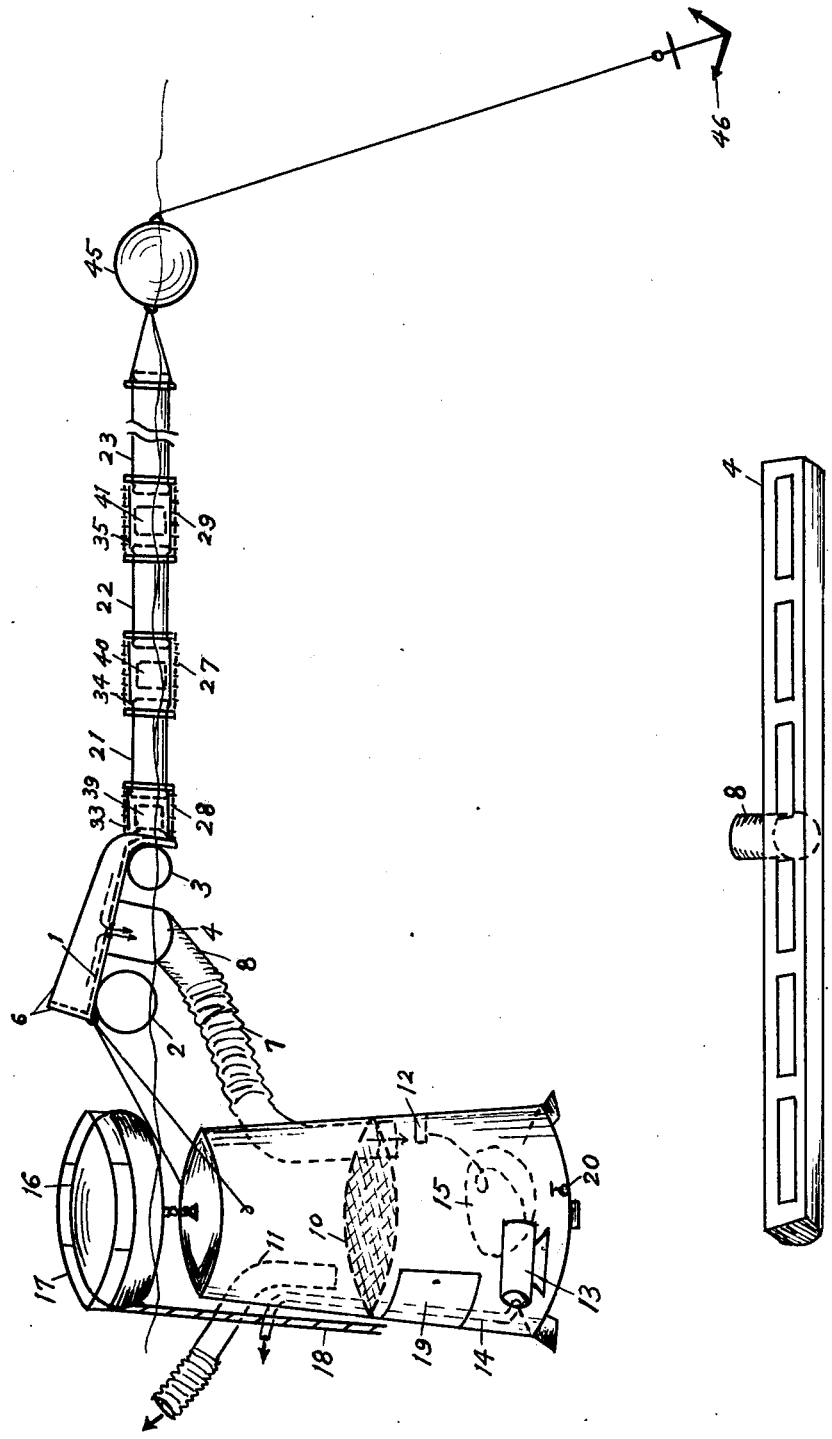
FIG. 2 shows a side view of FIG. 1.
Figure 3:
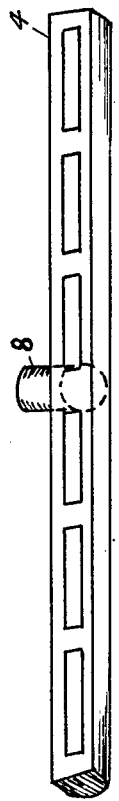
FIG. 3 shows a stereographic view of an oil collecting tube.

As shown in FIGS. 1 and 2 a dustpan-like collecting panel has two water proof floating tubes 2 and 3 longitudinally mounted underneath said panel. This is for holding said panel floatingly on a sea surface inclined at a 15 to 20 degree angle because said tubes are different in diameters. A "U" shape oil collecting tube 4 (better seen in FIG. 3) having both ends sealed and several apertures cut into its top surface is mounted longitudinally underneath and abuts against said panel. An equal number of apertures 5 are cut at the center line of the collecting panel for cooperating with said apertures of the tube the receive oil flowing from said apertures into the tube by the natural force of waves. Elevated sidewalls 6 built along three edges of said panel (better seen in FIG. 2) are provided for preventing oil overflow to the rear side of the panel. Thereafter no more pollution will be diffused but a better oil collecting result will be achieved. A flexible pipe 7 connects T fitting 8 of said tube 4 and directs oil flow to a container 9 (better seen in FIG. 2) wherein oil and water are separated automatically by gravity. Oil is now directed thru a filter 10 and accumulated at an upper portion of the container. Thereafter oil can be removed for storage on a ship nearby through pipe 11. A water level switch 12 is provided for controlling water pump 13 in order to evacuate excess water from the container thru pipe 14 automatically. A sinker weight 15 is placed at the bottom of the container for balancing the floating force of float 16 to keep said container at a predetermined depth below the sea surface. A railing 17 and a ladder 18 are secured to float 16 for assembly and repair work required by the system. A water proof door 19 is built at one side of the container for inspection and cleaning purpose. The door also serves as an inlet for water when the door is opened in order to sink the container quickly. A valve 20 located at the lowest end of the container is provided to drain water when the container is not in use. Certain numbers of air proof floating tubes 21, 22, 23, 24, 25, 26, . . . . (depending upon how large an area from which it is desired to collect oil) are connected to each other and to the panel. This is by chains 27, 28, 29, 30, 31, 32, providing for flexibility and forming a continuous tubular chain to retain floating oil within the area. A desired number of strong rubber tubes 33, 34, 35, 36, 37, 38, are used for connecting each end of the floating tubes. A spongy material 39, 40, 41, 42, 43, 44, is used between each end of the floating tubes for protecting the tubes when bounced by the waves. A float 45 and an anchor 46 are linked to the end of the tubular chain for anchoring the whole collection system in a down wind direction at a proper place where floating oil has. A screen 47 covers each aperture on the panel. The electric power for the water pump 13 in the container 9 is supplied from a ship nearby.

I claim:

1. Apparatus for collecting oil from the surface of a body of water, said apparatus comprising an elongated horizontally arranged collecting panel with a flat surface supported by buoyant means under the front and rear elongated edges of said panel and extending the length of said edges, fluid inlet openings located in the surface of said collecting panel and joined by a manifold collecting liquid from said inlet openings, sidewalls extending upwardly from a rear elongated edge of said panel and its two opposite edges adjacent thereto, spaced apart floating booms with their first ends connected to a forward edge of each of said opposite edges, anchor means connected to second ends of said booms and being constructed and arranged to retain said booms spaced apart and extending forwardly of said collecting panel, a receptacle for collected liquid floatingly arranged adjacent said panel in fluid communication by flexible conduit means with an inlet therein located below the level of an outlet from said manifold, pump means located within said receptacle near the bottom thereof for discharging heavier liquid in said receptacle near the bottom thereof, outlet means adjacent an upper portion of said receptacle for discharging collected lighter liquid therefrom.

2. The apparatus of claim 1 further including liquid level automatic pump switch control means for initiating pump operation responsively to the level of collected heavier liquid; ballast means for retaining said receptacle in a vertical position along its elongate axis with the pump in the bottom area of said receptacle.

3. The apparatus of claim 1 wherein the booms are tubular and air-tight.

* * * * *

UNITED STATES PATENT AND TRADEMARK OFFICE
CERTIFICATE OF CORRECTION

PATENT NO. : 4,146,482
DATED : March 27, 1979
INVENTOR(S) : Ji Yn Shyu

It is certified that error appears in the above—identified patent and that said Letters Patent is hereby corrected as shown below:

On the Title Page, item (73) should read

-- Yin-Lung Yang, Kanshan, Taiwan, a part interest --.

Signed and Sealed this

Fourteenth Day of October 1980

[SEAL]

Attest:

SIDNEY A. DIAMOND

Attesting Officer     Commissioner of Patents and Trademarks